United States Patent
Zweigle et al.

(10) Patent No.: US 10,333,312 B2
(45) Date of Patent: Jun. 25, 2019

(54) DISTRIBUTED CONTROL IN ELECTRIC POWER DELIVERY SYSTEMS

(71) Applicant: Schweitzer Engineering Laboratories, Inc., Pullman, WA (US)

(72) Inventors: Gregory C. Zweigle, Pullman, WA (US); Ellery A. Blood, Moscow, ID (US)

(73) Assignee: Schweitzer Engineering Laboratories, Inc., Pullman, WA (US)

(*) Notice: Subject to any disclaimer, the term of this patent is extended or adjusted under 35 U.S.C. 154(b) by 777 days.

(21) Appl. No.: 14/303,827

(22) Filed: Jun. 13, 2014

(65) Prior Publication Data

US 2015/0005970 A1 Jan. 1, 2015

Related U.S. Application Data

(60) Provisional application No. 61/839,774, filed on Jun. 26, 2013.

(51) Int. Cl.
*H02J 4/00* (2006.01)
*H02J 3/24* (2006.01)
(Continued)

(52) U.S. Cl.
CPC . *H02J 3/24* (2013.01); *H02J 3/38* (2013.01); *H02J 13/0079* (2013.01); *Y02E 40/72* (2013.01); *Y04S 10/12* (2013.01)

(58) Field of Classification Search
CPC . H02J 3/24; H02J 3/38; H02J 13/0079; Y02E 40/72; Y04S 10/12
See application file for complete search history.

(56) References Cited

U.S. PATENT DOCUMENTS

| | | | |
|---|---|---|---|
| 4,084,103 A | 4/1978 | Burns | |
| 5,222,009 A | 6/1993 | Scharnick | |

(Continued)

OTHER PUBLICATIONS

PCT/US2014/018666 Patent Cooperation Treaty, International Search Report and Written Opinion of the International Searching Authority, dated Jul. 16, 2014.

(Continued)

*Primary Examiner* — M. N. Von Buhr
(74) *Attorney, Agent, or Firm* — Jared L. Cherry; Richard M. Edge

(57) ABSTRACT

This disclosure includes various systems and methods for determining an operating stage based on electrical conditions in electric power delivery systems and identifying a control strategy based upon the operating stage. The control strategy may be selected and customized to avoid or to ameliorate stresses in an electric power delivery system while maintaining the stability of electric power delivery systems. Various embodiments consistent with the present disclosure may include a distributed controller configured receive a plurality of indications of electrical conditions from a plurality of control devices in electrical communication with the electrical power delivery system. The distributed controller may determine an operating stage from among a plurality of operating stages based upon the plurality of indications of electrical conditions. The distributed controller may further identify a control strategy based upon the operating stage. The control strategy may be communicated to and implemented by the plurality of control devices.

20 Claims, 6 Drawing Sheets

(51) Int. Cl.
*H02J 3/38* (2006.01)
*H02J 13/00* (2006.01)

(56) References Cited

U.S. PATENT DOCUMENTS

| | | | |
|---|---|---|---|
| 5,963,457 | A | 10/1999 | Kanoi |
| 6,574,740 | B1 | 6/2003 | Odaohhara |
| 7,096,175 | B2 | 8/2006 | Rehtanz |
| 7,457,088 | B2 | 11/2008 | Hou |
| 7,999,405 | B2 | 8/2011 | Peterson |
| 8,554,382 | B2 | 10/2013 | Hindi |
| 8,849,737 | B1 | 9/2014 | Engler |
| 9,244,475 | B2 * | 1/2016 | Stanczak ............. H02H 1/0092 |
| 9,383,735 | B2 * | 7/2016 | Schweitzer, III ...... G05B 13/02 |
| 9,819,227 | B2 | 11/2017 | Zweigle |
| 2002/0135962 | A1 | 9/2002 | Tang |
| 2003/0220740 | A1 | 11/2003 | Intriligator |
| 2004/0247059 | A1 | 12/2004 | Seto |
| 2004/0257059 | A1 | 12/2004 | Mansingh |
| 2005/0099747 | A1 | 5/2005 | Zima |
| 2005/0125104 | A1 | 6/2005 | Wilson |
| 2006/0195229 | A1 | 8/2006 | Bell |
| 2008/0109205 | A1 | 5/2008 | Nasle |
| 2009/0076661 | A1 | 3/2009 | Pearson |
| 2009/0076749 | A1 | 3/2009 | Nasle |
| 2009/0204245 | A1 | 8/2009 | Sustaeta |
| 2010/0013632 | A1 | 1/2010 | Salewske |
| 2010/0063641 | A1 * | 3/2010 | Scholten ................ G05B 15/02 700/287 |
| 2010/0204844 | A1 | 8/2010 | Rettger |
| 2011/0035065 | A1 * | 2/2011 | Schweitzer, III ... H02J 13/0062 700/286 |
| 2011/0066301 | A1 | 3/2011 | Donolo |
| 2011/0125293 | A1 | 5/2011 | Havlena |
| 2011/0202467 | A1 * | 8/2011 | Hilber .................. G06Q 50/188 705/80 |
| 2012/0098345 | A1 * | 4/2012 | Oldenburg ................ H02J 1/10 307/80 |
| 2012/0331082 | A1 | 12/2012 | Smith |
| 2013/0066482 | A1 * | 3/2013 | Li ............................ H02J 3/14 700/297 |
| 2013/0088239 | A1 | 4/2013 | Mynam |
| 2013/0107401 | A1 * | 5/2013 | Helt ........................ H02H 7/09 361/33 |
| 2013/0113285 | A1 | 5/2013 | Hyde |
| 2013/0138257 | A1 * | 5/2013 | Edenfeld .................. F03D 7/04 700/287 |
| 2013/0138260 | A1 | 5/2013 | Divan et al. |
| 2013/0274940 | A1 * | 10/2013 | Wei ........................ G05B 19/02 700/291 |
| 2014/0001977 | A1 * | 1/2014 | Zacharchuk ........ H04L 12/2816 315/291 |
| 2014/0244058 | A1 | 8/2014 | Zweigle |
| 2015/0281287 | A1 * | 10/2015 | Gill ........................ G06F 21/55 726/1 |
| 2015/0380937 | A1 * | 12/2015 | Forbes, Jr. ................ H02J 3/14 700/295 |
| 2016/0226248 | A1 * | 8/2016 | Mosebrook ......... H04L 12/2816 |

OTHER PUBLICATIONS

Qun Debbie Zhou, "Online Voltage Stability Prediction and Control Using Computational Intelligence Technique," In Doctoral dissertation, The University of Manitoba, Sep. 21, 2010.

PCT/US2014/042806 Patent Cooperation Treaty, International Search Report and Written Opinion of the International Searching Authority, dated Jan. 29, 2015.

Z. Liu, Z. Chen, H. Sun, and C. Liu, "Control and Protection Cooperation Strategy for Voltage Instability," proceedings of the 47th International Universities Power Engineering Conference, London, UK, Sep. 2012.

Bogdan Otomega, Vincent Sermanson, and Thierry Van Cutsen, "Reverse-Logic Control of Load Tap Changers in Emergency Voltage Conditions," IEEE Bologna Power Tech Conference, Jun. 2003.

Da Silva, et al., "State Forecasting in Electric Power Systems", IEE, Sep. 1983.

Mathieu, et al., "State Estimation and Control of Electric Loads to Manage Real-Time Energy Imbalance", IEEE, Jul. 2013.

Monticelli, A., "Electric Power System State Estimation", IEEE, Feb. 2000.

"Reliability Assessment Guidebook", ver. 1.2, North American Electric Reliability Corporation, Mar. 18, 2008.

Borhan et al., "MPC-Based Energy Management of a Power-Split Hybrid Electric Vehicle", IEEE, May 2012.

Wen et al., "Optimal Coordinated Voltage Control for Power System Voltage Stability", IEEE, May 2004.

* cited by examiner

DISTRIBUTED CONTROL IN ELECTRIC POWER DELIVERY SYSTEMS

RELATED APPLICATIONS

This application claims the benefit under 35 U.S.C. § 119(e) of U.S. Provisional Application No. 61/839,774, filed 26 Jun. 2013, naming Gregary C. Zweigle and Ellery A. Blood as inventors, which is hereby incorporated by reference herein in its entirety.

TECHNICAL FIELD

This disclosure relates to relay distributed control in electric power delivery systems. More particularly, this disclosure relates to systems and methods for determining an operating stage based on electrical conditions in electric power delivery systems and identifying a control strategy based upon the operating stage. The control strategy may be selected and customized to avoid and/or to ameliorate stresses in an electric power delivery system while maintaining the stability of the system.

BRIEF DESCRIPTION OF THE DRAWINGS

Non-limiting and non-exhaustive embodiments of the disclosure are described, including various embodiments of the disclosure with reference to the figures, in which.

DETAILED DESCRIPTION

Figure 1:
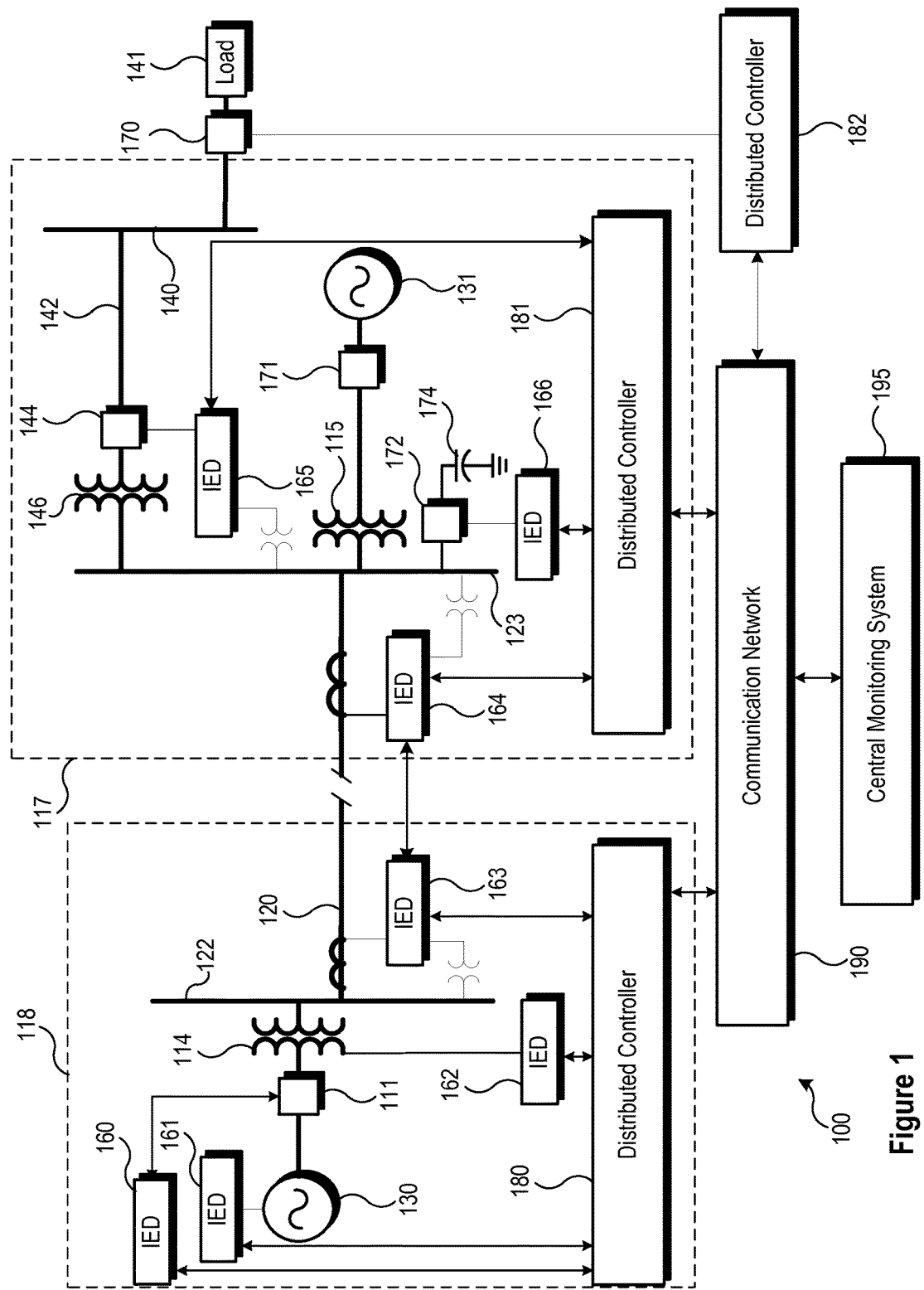
FIG. 1 is a simplified one-line diagram of an electric power delivery system configured to implement a relay distributed control scheme consistent with embodiments of the present disclosure.

A cascading outage in an electric power delivery system may be caused by an incremental weakening of the system (e.g., the unavailability of a transmission line, the unavailability of an electrical generator, etc.). The weakening of the system may be caused by the loss of assets, without simultaneous strengthening of the same system, unexpected increases in demand, and/or other factors. Losses of assets may include line trips, transformer trips, and reactive source loss through over-excitation limit trips. In response to the loss of assets, control actions may be implemented to increase the capacity of the system. Such actions may include reactive compensation, generation redispatch/dispatch, load adjustments, etc.

Various embodiments consistent with the present disclosure may utilize information collected by devices that monitor an electric power delivery system (e.g., relays, intelligent electronic devices (IEDs), etc.) together with information from devices operating at a system-level (e.g., a distributed controller, a supervisory system, etc.) to select an appropriate control strategy for managing the system. The system-level devices may identify potential instability in the system and select an appropriate control strategy to mitigate against such instability. In one scenario, for example, a control system may face a system that has been incrementally weakened as a result of the loss of one or more assets. When an outage affecting a portion of the electric power delivery system occurs, the system may be configured to determine whether the outage is an isolated event or an event that has the potential to cause a cascading outage. In this scenario, the most detailed outage information may be found at the devices monitoring the equipment affected by the outage. Accordingly, making this information available to higher level systems may allow for the higher level systems to analyze the information in the context of a wide-area stability assessment. The higher-level devices may receive time-synchronized information (e.g., synchrophasors) from lower-level devices that facilitates wide area analysis and control decisions.

Certain embodiments of the present disclosure may include a plurality of lower-level devices, such as a protective relay, configured to determine or estimate the cause of an asset removal and/or prospectively indicate a potential upcoming asset removal. Various devices may be configured to provide a pre-trip assessment of one or more signal trajectories (e.g., impedance rate-of-change, voltage/current rate-of-change, voltage/current levels, and multi-dimensional directional flow of such quantities). Further, one or more higher-level devices, such as a distributed controller, may be configured to collect and process relay estimates and wide-area synchrophasor measurements. The higher-level devices may combine information received from the lower-level devices with system level information to determine whether asset removal is due to an isolated event or is due to participation in a cascade. Based upon such a determination, the system may adopt an appropriate control strategy. For example, if the removal is an isolated event or if the cascade is predicted to quickly stabilize without intervention, a control strategy may be adopted that configures the system to withstand the temporary condition.

The embodiments of the disclosure will be best understood by reference to the drawings. It will be readily understood that the components of the disclosed embodiments, as generally described and illustrated in the figures herein, could be arranged and designed in a wide variety of different configurations. Thus, the following detailed description of the embodiments of the systems and methods of the disclosure is not intended to limit the scope of the disclosure, as claimed, but is merely representative of possible embodiments of the disclosure. In addition, the steps of a method do not necessarily need to be executed in any specific order, or even sequentially, nor do the steps need be executed only once, unless otherwise specified.

In some cases, well-known features, structures, or operations are not shown or described in detail. Furthermore, the described features, structures, or operations may be combined in any suitable manner in one or more embodiments. For example, throughout this specification, any reference to "one embodiment," "an embodiment," or "the embodiment" means that a particular feature, structure, or characteristic described in connection with that embodiment is included in at least one embodiment. Thus, the quoted phrases, or variations thereof, as recited throughout this specification are not necessarily all referring to the same embodiment.

Several aspects of the embodiments disclosed herein may be implemented as software modules or components. As used herein, a software module or component may include any type of computer instruction or computer executable code located within a memory device that is operable in conjunction with appropriate hardware to implement the programmed instructions. A software module or component may, for instance, comprise one or more physical or logical blocks of computer instructions, which may be organized as a routine, program, object, component, data structure, etc. that performs one or more tasks or implements particular abstract data types.

In certain embodiments, a particular software module or component may comprise disparate instructions stored in different locations of a memory device, which together implement the described functionality of the module. Indeed, a module or component may comprise a single instruction or many instructions, and may be distributed over several different code segments, among different programs, and across several memory devices. Some embodiments may be practiced in a distributed computing environment where tasks are performed by a remote processing device linked through a communication network. In a distributed computing environment, software modules or components may be located in local and/or remote memory storage devices. In addition, data being tied or rendered together in a database record may be resident in the same memory device, or across several memory devices, and may be linked together in fields of a record in a database across a network.

Embodiments may be provided as a computer program product including a non-transitory machine-readable medium having stored thereon instructions that may be used to program a computer or other electronic device to perform processes described herein. The non-transitory machine-readable medium may include, but is not limited to, hard drives, floppy diskettes, optical disks, CD-ROMs, DVD-ROMs, ROMs, RAMs, EPROMs, EEPROMs, magnetic or optical cards, solid-state memory devices, or other types of media/machine-readable medium suitable for storing electronic instructions. In some embodiments, the computer or other electronic device may include a processing device such as a microprocessor, microcontroller, logic circuitry, or the like. The processing device may further include one or more special purpose processing devices such as an application specific interface circuit (ASIC), PAL, PLA, PLD, field programmable gate array (FPGA), or any other customizable or programmable device.

Electric power generation and delivery systems are designed to generate, transmit, and distribute electrical energy to loads. Electric power generation and delivery systems may include equipment such as: electrical generators, electrical motors, power transformers, power transmission and distribution lines, circuit breakers, switches, buses, voltage regulators, capacitor banks, and the like. Such equipment may be monitored, controlled, automated, and/or protected using one or more intelligent electronic devices (IEDs) that may receive electric power delivery system information from the equipment, make decisions based on the information, and provide monitoring, control, protection, and/or automation outputs to the equipment. As used herein, monitoring, control, protection, and/or automation may generally be referred to as "control" unless otherwise specifically indicated.

In some embodiments, an IED may include, for example, remote terminal units, differential relays, distance relays, directional relays, feeder relays, overcurrent relays, voltage regulator controls, voltage relays, breaker failure relays, generator relays, motor relays, bay controllers, meters, recloser controls, governors, exciters, statcom controllers, static VAR compensator (SVC) controllers, on-load tap changer (OLTC) controllers, and the like. Further, in some embodiments, IEDs may be communicatively connected via a data transmission network that includes, for example, multiplexers, routers, hubs, gateways, firewalls, and/or switches to facilitate communications on the network. Networking and communication devices may also be integrated into an IED and/or be in communication with an IED. As used herein, the term IED may refer to a single discrete IED or to a system of multiple IEDs operating together.

FIG. 1 is a simplified one-line diagram of an electric power delivery system 100 configured to implement a relay distributed control scheme consistent with embodiments of the present disclosure. Although illustrated as a one-line diagram for purposes of simplicity, an electric power delivery system 100 may also be configured as a three-phase power system. The electric power delivery system 100 may include, among other things, electric generators 130 and 131 that are configured to generate an electric power output, which in some embodiments may be a sinusoidal waveform.

Generators 130 and 131 may be selectively connected to the electric power delivery system 100 using switches or circuit breakers 111 and 171, respectively. Step-up transformers 114 and 115 may be configured to increase the output of the electric generators 130 and 131, respectively, to higher voltage sinusoidal waveforms. Buses 122 and 123 may distribute the higher voltage sinusoidal waveform to a transmission line 120 disposed between buses 122 and 123. Step-down transformer 146 may decrease the voltage of the sinusoidal waveform from bus 123 to a lower voltage suitable for electric power distribution on line 142. Distribution line 142 may be selectively connectable to bus 123 via circuit breaker or switch 144, and may distribute electric power to a distribution bus 140. Switch 144 may be controlled by IED 165.

Load 141 (e.g., a factory, residential load, motor, or the like) may be selectively connected to distribution bus 140 using switch or circuit breaker 170, which may be actuated by distributed controller 182. In addition, distributed controller 182 may be configured to meter electric power provided to load 141. According to some embodiments, distributed controller 182 may be configured as a voltage regulator control for regulating voltage to load 141 using a voltage regulator (not separately illustrated). Additional transformers or other equipment may be used to further step down a voltage from the distribution bus 140 to the load 141.

Other equipment may be included in the electric power delivery system 100. For example, a switched capacitor bank (SCB) 174 may be selectively connectable to transmission bus 123 using circuit breaker or switch 172. Other equipment may be included in the electric power delivery system 100 including, for example, static VAR compensators, reactors, load tap changers, voltage regulators, autotransformers, and/or the like (not specifically illustrated). Generators 130 and 131 may comprise any generator capable of providing electric power to the electric power delivery system 100, and may include, for example, synchronous generators, turbines (such as hydroelectric turbines, wind turbines, gas-fired, coal-fired, and the like), photovoltaic electric generators, tidal generators, wave power generators, and the like. Such generation machines may include components such as, for example, power-electronically coupled interfaces, doubly-fed induction machines, direct coupled AC-DC/DC-AC transfer devices, and/or the like. It should be noted that these are not exhaustive lists, as other equipment, machines, and connected devices may be included in the electric power delivery system 100 within the scope of this disclosure.

Certain events may drive electric power delivery systems into an unstable state and/or condition. For example, unstable conditions may be caused or exacerbated by voltage collapse, frequency deviation, and/or physical or structural limitations of components of the electric power delivery system 100. Voltage collapse generally refers to loads demanding more power than a electric power delivery system (or generators thereof) can deliver. The voltage provided to the loads may decrease, resulting in additional current draw. Resultant current levels may result in further voltage drop, and the effect may continue until generation is unable to supply the needed reactive power. Large frequency deviations may be caused by transient imbalances between the supply and consumption of electrical power. Structural limitations on electric power delivery system 100, including the ability to transfer power, may also result in unstable conditions. One example of a structural limitation may include thermal limitations that if exceeded, may result in transmission lines and/or distribution busses being taken out of service.

A plurality of IEDs 160-166 may be used to monitor, protect, and automate aspects of electric power delivery system 100. IEDs 160-166 may be used to control various aspects of the electric power delivery system 100. Accordingly, IEDs 160-166 may include protection elements, such as an instantaneous overcurrent element; an inverse-time overcurrent element; a thermal element; a reactive power threshold; a distance element; a current differential element; a load encroachment element; an impedance characteristic; a volts/Hz characteristic; an undervoltage element; a directional element; a negative sequence current element; a loss of excitation element; a negative sequence voltage element; an overvoltage element; a ground fault element; a high-impedance fault element; an under frequency element; an over frequency element; and/or the like.

Furthermore, IEDs may include control elements related to electric power delivery system equipment. Accordingly, an IED may be configured as a reactive power controller, a capacitor bank controller, a transformer tap changer controller, a generator over-excitation limit controller, a governor controller, a power system stabilizer controller, a shunt reactor controller, a DC line controller, an inverter controller, and/or the like. It should be noted that a single IED may include one or more protection elements and/or control elements.

The IEDs 160-166 may gather equipment status from one or more pieces of monitored equipment (e.g., generator 130, step up transformer 114, breaker 111, etc.). Equipment status may relate to the status of the monitored equipment and may include, for example, breaker or switch status (e.g., open or closed), tap position status, equipment status (e.g., operational or non-operational), voltages, currents, input power, and/or the like. Further, the IEDs 160-166 may receive measurements associated with monitored equipment using sensors, transducers, actuators, and/or the like. Measurements may relate to a measured status of the monitored equipment, and may include, for example, voltage, current, temperature, pressure, density, infrared absorption, viscosity, speed, rotational velocity, mass, and/or the like.

Based on the equipment status and/or measurements associated with electric power delivery system 100, IEDs 160-166 may be configured to derive or calculate one or more values. Such values may be any values derived or calculated from the measurements and/or equipment status and may include, for example, power (real and reactive values), magnitudes and angles of voltages and currents, frequencies, rates of change of frequency, phasors, synchrophasors, fault distances, differentials, impedances, reactances, symmetrical components, alpha components, Clarke components, alarms, and/or the like.

IEDs may also determine an operating stage using equipment status, measurements, and/or derived values. Control strategies may be tailored to a plurality of operating stages to improve the reliability of electric power system 100. When a particular operating stage is implemented, appropriate control strategies may be communicated to a variety of devices throughout electric power system 100. For example, according to some embodiments, an appropriate control strategy based upon a particular operating stage may be communicated among IEDs 160-166 and distributed controllers 180-182.

According to certain embodiments, IEDs 160-166 may issue control instructions to the monitored equipment in order to control various aspects of operation of the monitored equipment. The IED may utilize equipment status, measurements, and/or derived values to determine an appropriate control instruction based on, for example, existing conditions and/or a control strategy. According to the specific configuration illustrated in FIG. 1, IEDs 163 and 164 may monitor conditions on transmission line 120. IED 160 may be configured to issue control instructions to breaker 111. IEDs 163 and 165 may monitor conditions on buses 122 and 123, respectively. IED 161 may monitor and issue control instructions to the electric generator 130. IED 162 may monitor and issue control instructions to transformer 114. IED 166 may control operation of breaker 172 to connect or disconnect SCB 174.

Control actions may include discontinuous control actions or continuous control actions. Discontinuous control actions may modify a topology of the electric power delivery system. Some examples of discontinuous control actions include, without limitation, opening a breaker, inserting shunt capacitance, removing a transmission line from service, etc. Continuous control actions may not modify a topology of the electric power delivery system. Examples of continuous control actions include, without limitation, adjusting operating parameters of a control device, changing a tap position of an on-load tap changer, etc.

IEDs 160-166 may be communicatively linked to respective distributed controllers 180-182. In the illustrated embodiment, IEDs 160-163 are in communication with distributed controller 180, and IEDs 164-166 are in communication with distributed controller 181. Distributed controller 182 is in communication with breaker 170, and may be configured to perform any of the functions performed by IEDs 160-166 in addition to distributed controller functions, as described below. Moreover, according to certain embodiments, the functions described herein and associated with distributed controllers 180-182 may be performed by any of IEDs 160-166. In certain embodiments, distributed controllers 180-182 may be embodied as the SEL-2020, SEL-2030, SEL-2032, SEL-3332, SEL-3378, or SEL-3530 available from Schweitzer Engineering Laboratories, Inc. of Pullman, Wash.

Distributed controllers 180-182 may be in communication with a communication network 190. Communication network 190 may facilitate data transmission among a variety of connected devices. The communication network 190 of electric power delivery system 100 may utilize a variety of network technologies, and may comprise network devices such as modems, routers, firewalls, virtual private network servers, and the like. Further, in some embodiments, the IEDs 160-166 and other network devices (e.g., one or more communication switches or the like) may be communicatively coupled to communication network 190 through a network communications interface.

A central monitoring system 195 may also be in communication with distributed controllers 180-182 using communication network 190. According to various embodiments, central monitoring system 195 may comprise one or more of a variety of types of systems. For example, central monitoring system 195 may include a supervisory control and data acquisition (SCADA) system and/or a wide area control and situational awareness (WACSA) system.

Although not illustrated in FIG. 1, according to various embodiments one or more IEDs may be connected directly to communication network 190. Certain IEDs, such as IEDs 163 and 164, may be in direct communication to effect, for example, line differential protection of transmission line 120.

The IEDs 160-166 and distributed controllers 180-182 may communicate a variety of types of information to the central monitoring system 195, but not limited to, operational conditions, status and control information about the individual IEDs 160-166, event (e.g., a fault) reports, communication network information, network security events, and/or the like.

Protection and control operations associated with electric power delivery system 100 may be performed locally by IEDs 160-166 consistent with a specified control strategy, while operational conditions are communicated from IEDs 160-166 to higher-level data acquisition and control systems, such as distributed controllers 180-182 and central monitoring system 195. Based on the operational conditions received from IEDs 160-166 distributed controllers 180-182 and/or central monitoring system 195 may select an appropriate control strategy that is communicated to and implemented by IEDs 160-166.

According to various embodiments, operational conditions and controller conditions may be shared among distributed controllers 180-182 and coordination controllers throughout the electric power delivery system 100. The distribution of such information may provide each distributed controller 180-182 with information to improve automation, protection, and control of the electric power delivery system.

Electric power delivery system 100 may be configured to operate in a variety of operating stages. Operating stages may correspond with a particular control strategy. The control strategy may be tailored to provide flexibility during times of peak demand or temporary stress while maintaining the reliability of electric power delivery system 100. According to some embodiments, control strategies may be created to comply with applicable regulatory requirements, such as the reliability standards promulgated by the North American Electric Reliability Corporation (NERC).

A variety of conditions may create stresses within an electric power delivery system 100. For example, electric energy consumed by load 141 may approach or exceed the generation capacity of generators 130 and 131 and/or the transmission capacity of a transmission line 120. In response to such conditions, an appropriate control strategy may be implemented by electric power delivery system 100. In one embodiment, the control strategy may adjust settings implemented by IEDs 160-166 in order to improve the tolerance of electric power delivery system 100 to temporary stresses. Such settings may include a modification of transformer load tap changers, increasing a threshold for VARs from generators 130 and 131, connecting capacitor bank 174, redistributing load among generators 130 and 131, etc. Depending upon the severity of the condition, generation capacity may be increased, a demand response strategy (e.g., industrial load shaping) may be implemented, re-dispatch generation may be implemented, etc. Where the condition threatens the stability of electric power delivery system 100, actions may be taken to ensure stability, such as shedding load, transmission line loading relief, etc.

According to one specific embodiment, electric power delivery system 100 may be configured to operate in at least four operating stages: a normal stage, an alert stage, an emergency stage, and an extreme stage. All operating stages other than the normal stage may be defined by one or more electrical characteristics indicative of a condition tending toward instability in electric power delivery system 100. An alert stage may be triggered by an indication of a low voltage at one or more locations in electric power delivery system 100 and/or an indication of an impending overload of one or more components (e.g., transmission line 120) of electric power delivery system 100. In the alert stage, a control strategy may be implemented that increases the ability of electric power delivery system 100 to tolerate increased stresses associated with a temporary condition. According to some embodiments, the ability to tolerate increased stresses may be achieved by blocking or delay implementation of certain categories of control actions during a temporary condition in the electrical power delivery system 100.

If conditions further deteriorate in the alert operating stage, the emergency stage or the extreme stage may be triggered. In the emergency stage, a control strategy may be implemented to increase generation capacity of electric power delivery system 100 and/or acquire electric power from a remote generation source. In the extreme stage, a control strategy may be implemented to reduce load on the electric power delivery system 100 and/or redistribute generation.

Figure 2A:
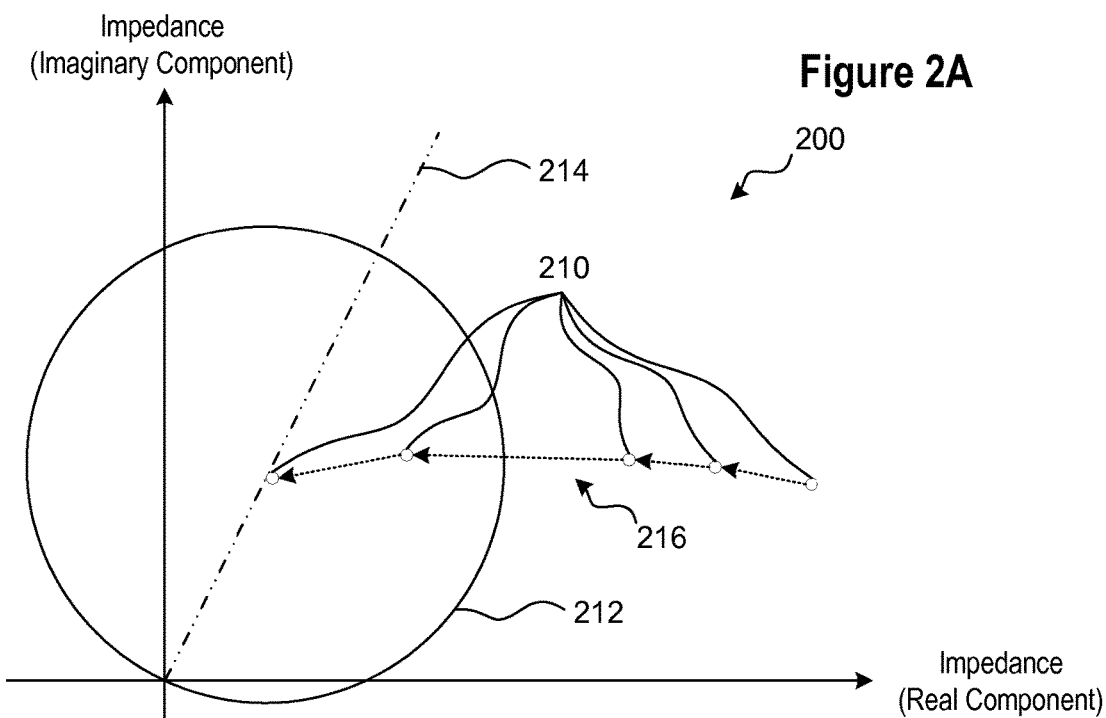
FIG. 2A is a plot of a plurality of exemplary complex impedance measurements over time associated with a fault condition in an electric power delivery system consistent with embodiments of the present disclosure.

FIG. 2A is a plot 200 of a plurality of exemplary complex impedance measurements over time associated with a fault condition in an electric power delivery system consistent with embodiments of the present disclosure. The real component of the complex impedance is graphed along the X-axis, while the reactive component of the complex impedance is graphed along the Y-axis. The plot 200 illustrates a plurality of measurements 210 over a period of time. The plot 200 also illustrates an trip boundary 212 and a line impedance locus 214. A symptom of an overload condition may be detectible as a gradual meandering trajectory which falls within a trip boundary 212. Similarly, a symptom of a fault condition may be detectible as a rapid and direct trajectory which falls within a trip boundary 212 and approaches the line impedance locus 214.

An intelligent electronic device consistent with the present disclosure may analyze the plurality of measurements 210 and determine a trajectory 216 of the measurements indicative of a fault. Certain features of the trajectory 216 may be indicative of the fault condition. Such features may include the rate of change of the plurality of measurements 210, the directness and/or direction of the trajectory, and/or the proximity of any of the plurality of measurements 210 to the line impedance locus 214.

Figure 2B:
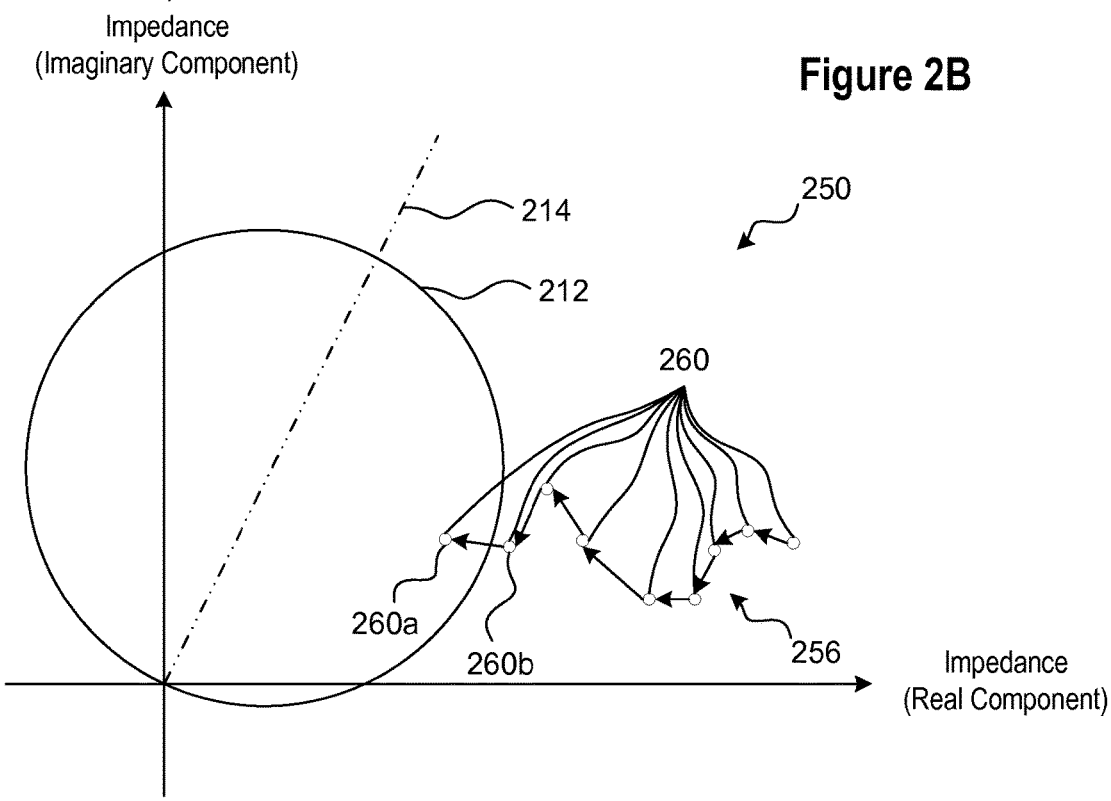
FIG. 2B is a plot of a plurality of exemplary complex impedance measurements over time associated with an impending overload condition in an electric power delivery system consistent with embodiments of the present disclosure.

FIG. 2B is a plot 250 of a plurality of exemplary complex impedance measurements over time associated with an impending overload condition in an electric power delivery system consistent with embodiments of the present disclosure. As in FIG. 2A, the real component of the complex impedance is graphed along the X-axis, while the imaginary component of the complex impedance is graphed along the Y-axis, and a trip boundary 212 and a line impedance locus 214 is illustrated.

In FIG. 2B trajectory 256 of the plurality of measurements 260 has a lower rate of change in comparison to trajectory 216 of FIG. 2A, and the trajectory 256 does not approach the line impedance locus 214. Accordingly, trajectory 256 may be determined to be an overload rather than a fault.

According to some embodiments, an impending overload condition may be signaled prior to trajectory 256 crossing the trip boundary 212. For example, an impending overload condition may be determined using measurement 260b, while an overload condition may be determined using measurement 260a. As the trajectory 256 approaches the trip boundary 212 in a manner indicative of an impending overload, a control may be implemented to avoid and/or ameliorate the overload condition. According to some embodiments, the control strategy may reposition the trip boundary 212 in order to provide additional resilience during a period of temporary stress.

Figure 3:
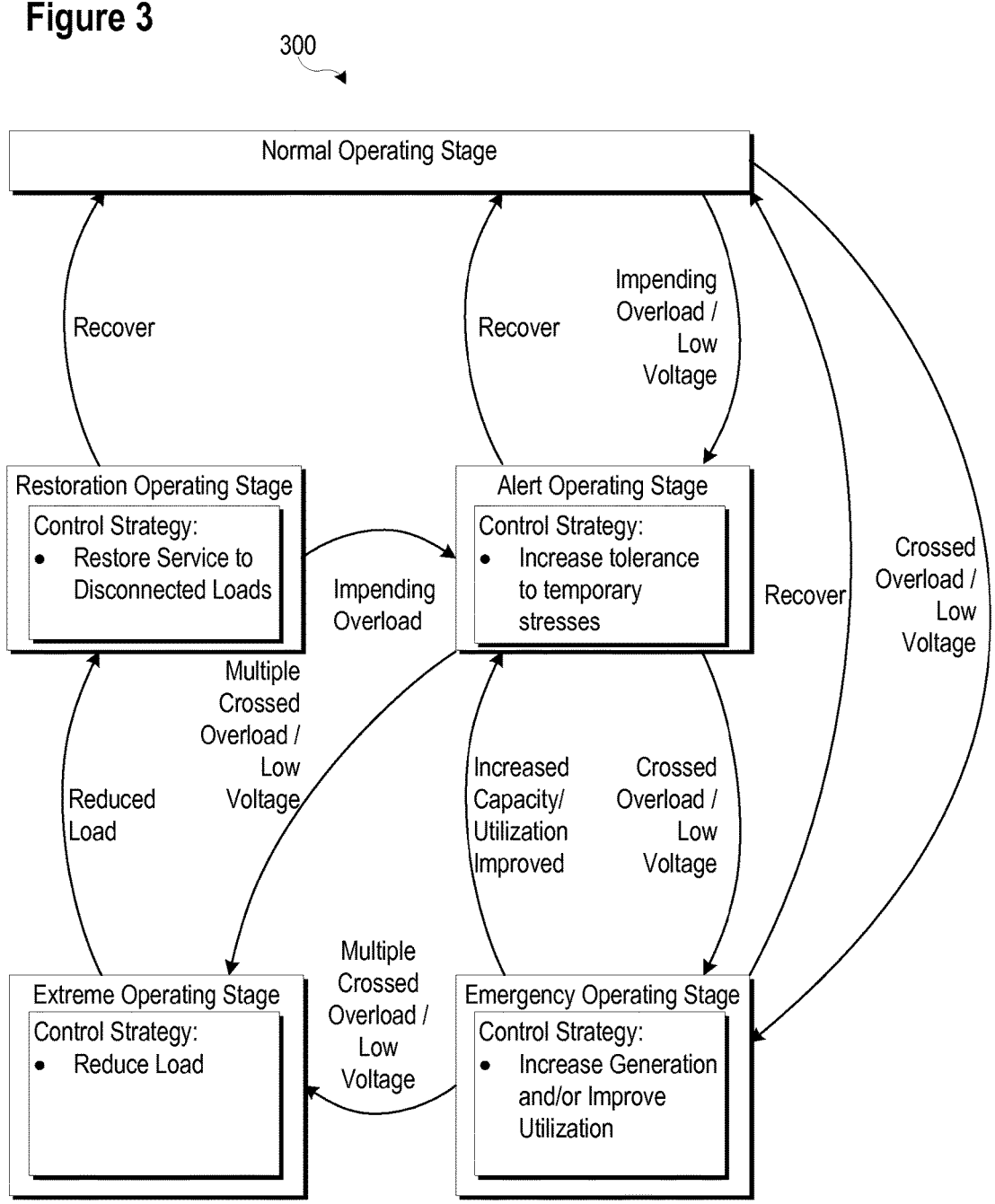
FIG. 3 illustrates a state diagram of a distributed controller consistent with embodiments of the present disclosure.

FIG. 3 illustrates a state diagram 300 of a distributed controller consistent with embodiments of the present disclosure. The illustrated embodiment shows that the distributed controller may operate in at least five operating stages: a normal stage, an alert stage, an emergency stage, an extreme stage, and a restoration stage. All operating stages other than the normal stage may be defined by one or more electrical characteristics indicative of a condition associated with instability in an electric power delivery system.

A distributed controller implementing state diagram 300 may move to an alert stage based upon an indication of a low voltage at one or more locations in an associated electric power delivery system and/or an indication of an impending overload of one or more components of an associated electric power delivery system. Depending upon the severity of the low voltage, or upon the occurrence of an overload, the distributed controller may move directly to the emergency stage.

In the alert stage, a control strategy may be implemented that increases the ability of an electric power delivery system to tolerate increased stresses while maintaining safe operating conditions. Implementing the control strategy in the alert stage may, according to some embodiments, involve one or more of the following:

Modifying behavior of a transformer load tap changer (e.g., preventing or delaying tap changes (potentially for an extended period of time), adjusting a threshold at which a tap change would occur in the normal operating stage);

Adjusting a VARs threshold associated with a generator (e.g., blocking a protective action that would occur in the normal operating stage at a particular VAR threshold);

Adding VAR support through shunt capacitance;

Adjusting a threshold on an active VAR device, such as a static VAR compensators; and Adjusting a threshold on a direct current line to redistribute network loading.

In the alert stage, certain control actions may be blocked or delayed in order to allow the electrical power delivery system to withstand temporary periods of high demand.

If conditions further deteriorate from the alert stage, a controller implementing state diagram 300 may transition to the emergency stage or the alert stage. A transition to the emergency stage may be triggered by a crossed overload condition or a voltage falling below a threshold. Implementing the control strategy in the emergency stage may, according to some embodiments, involve one or more of the following:

Redispatching generation;

Starting reserve generation

Implementing a demand response scheme; and

Acquiring electric power from a remote generation source.

According to some embodiments, the control strategy in the emergency stage may include control actions permitted under Category C of the NERC Reliability Standards.

In the extreme stage, a controller implementing state diagram 300 may implement a control strategy that reduces load on the electric power generation system. A transition to the extreme stage may be triggered by multiple crossed overload conditions and/or low voltage measurements. Implementing the control strategy in the emergency stage may, according to some embodiments, involve one or more of the following:

Removing load, and

Implementing transmission line loading relief.

According to some embodiments, the control strategy in the emergency stage may include control actions permitted under Category B of the NERC rules, during N−1 conditions.

Following a reduction in the load in the extreme stage, a restoration stage may implement a control strategy for restoring service to any disconnected loads. According to some embodiments, disconnected loads may be restored in a particular sequence. The sequence of restoration of disconnected loads may be based upon a load priority, a likelihood of success of reconnecting a disconnected load while maintaining system stability, etc. From the restoration stage, state diagram 300 may return to the alert stage if additional impending overload conditions are detected. If the restoration of disconnected load is successful, state diagram 300 may return to the normal stage.

According to alternative embodiments, more or fewer operating stages may be implemented in a distributed controller consistent with the present disclosure. Further, the state diagram 300 may be implemented by a variety of types of equipment in an electric power delivery system. For example, such equipment may include in IED (e.g., relays, protective controllers, etc.) and/or central monitoring systems (e.g., a SCADA system, a WACSA system, etc.). It will be appreciated that a number of other suitable variations can be made to the state diagram 300 consistent with embodiments disclosed herein.

Figure 4A:
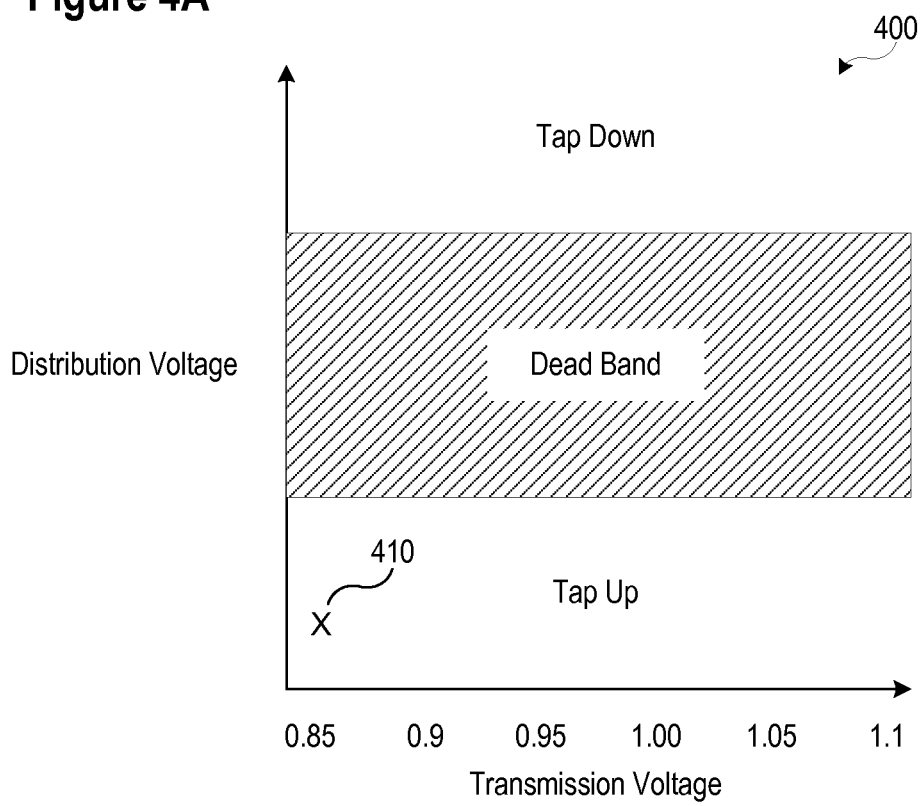
FIG. 4A illustrates a diagram showing exemplary thresholds for tap changes in a load tap changer when operating under normal conditions consistent with embodiments of the present disclosure.

FIG. 4A illustrates a diagram 400 showing exemplary thresholds for tap changes in a load tap changer when operating under normal conditions consistent with embodiments of the present disclosure. A transmission voltage is shown along the X-axis, and a distribution voltage is shown along the Y-axis. Under normal conditions, the load tap changer may tap up or down depending upon where a particular combination of transmission voltage and distribution voltage falls on diagram 400. In the "dead band," no changes to the tap position may be made. Where a point falls in the "tap up" or the "tap down" regions, a tap changer implementing the threshold shown in diagram 400 may adjust a tap position up or down, as appropriate.

Figure 4B:
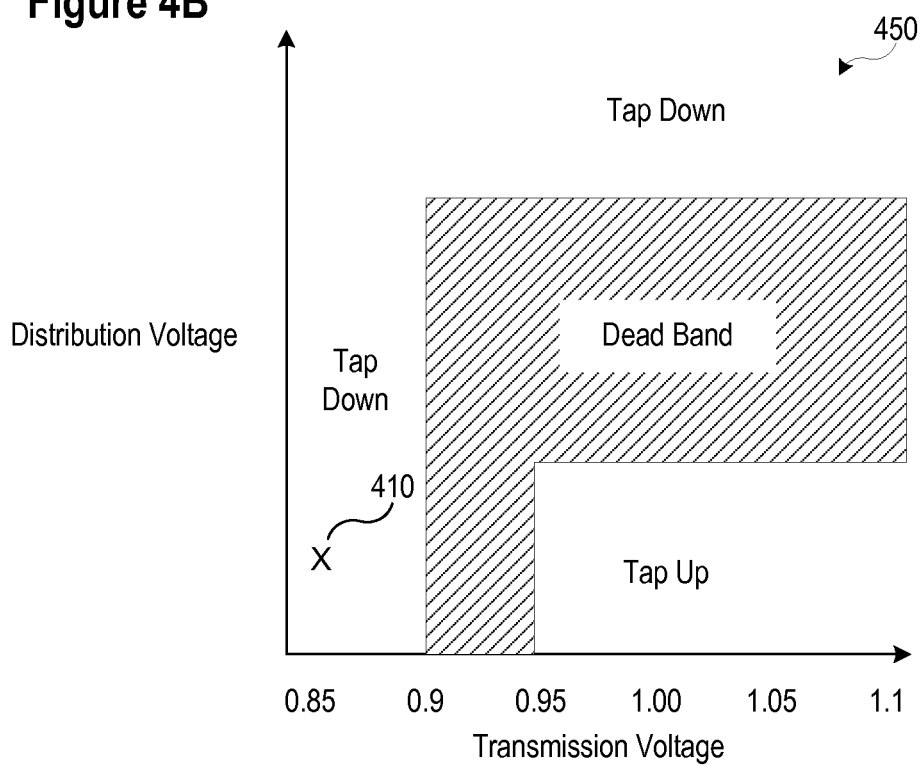
FIG. 4B illustrates a diagram showing exemplary modified thresholds for tap changes in a load tap changer when operating during an alert operating stage consistent with embodiments of the present disclosure.

FIG. 4B illustrates a diagram 450 showing exemplary modified thresholds for tap changes in a load tap changer when operating during an alert operating stage consistent with embodiments of the present disclosure. As described above, under various scenarios modifications may be made to thresholds associated with control devices based on an operating stage and an associated control strategy.

Point 410, which is shown in both FIG. 4A and FIG. 4B, may represent a measured electrical condition at a particular time. In FIG. 4A, point 410 falls within the range in which the load tap changer would tap up, while in FIG. 4B, point 410 falls within the range in which the load tap changer would tap down.

Information about control actions and/or control strategies may be shared among control devices (e.g., distributed controllers, IEDs, central monitoring systems, etc.) within an electric power delivery system. Based upon the control actions and/or control strategies, modifications may be implemented to control parameters associated with various types of monitored equipment. For example, control actions at the alert stage may include modification to set points for relays, load tap changing transformers, static VAR compensators, etc. A load tap algorithm may utilize load characteristic estimates to determine the best method to adjust load taps such that cascading effects in an electric power delivery system are arrested. For example, if the load is predominantly constant impedance, then minimizing the ability of the load tap changer to drive up distribution voltages may help relieve stress on the electric power delivery system.

Figure 5:
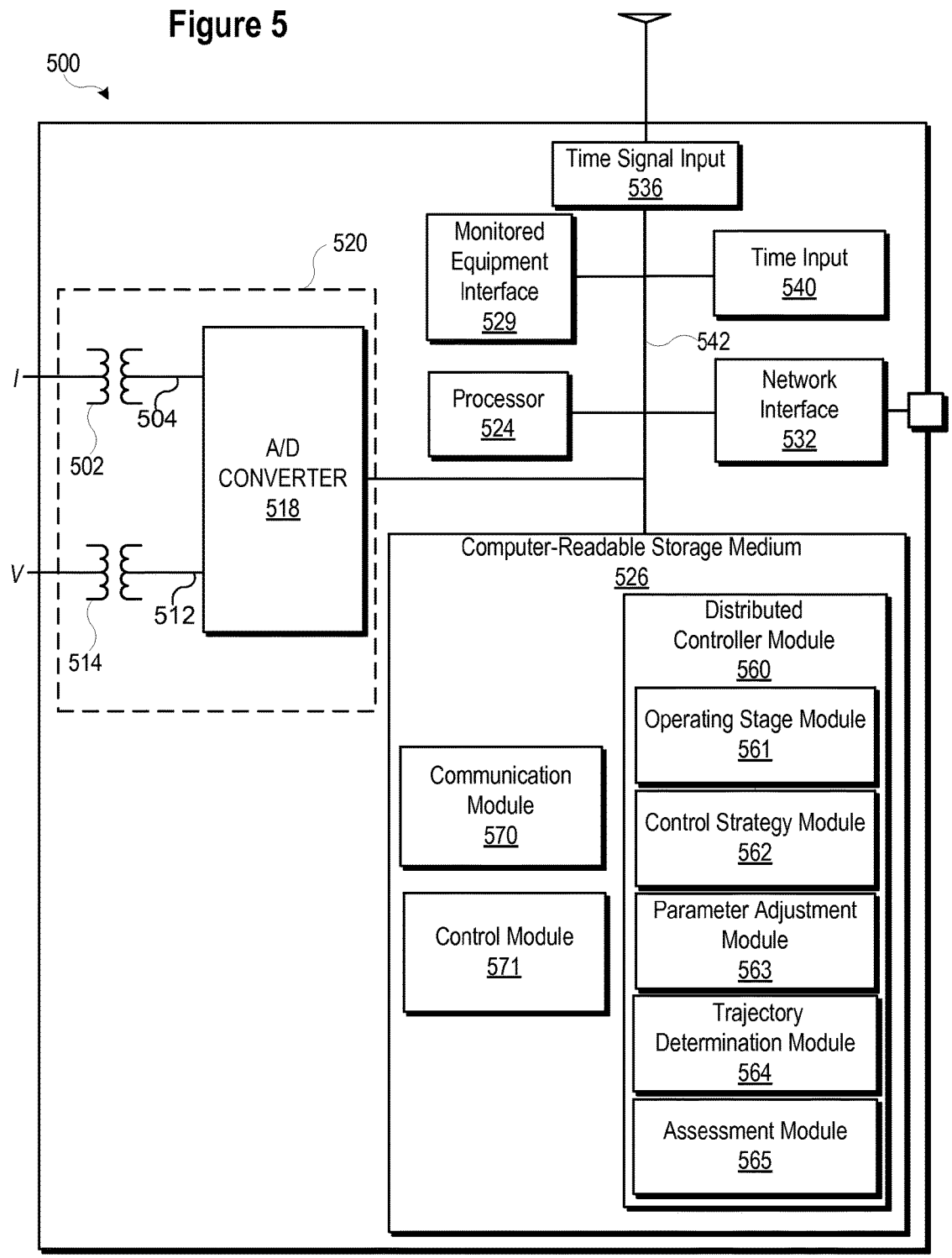
FIG. 5 illustrates a simplified functional block diagram of a distributed controller consistent with embodiments of the present disclosure.

FIG. 5 illustrates a simplified functional block diagram of a distributed controller 500 consistent with embodiments of the present disclosure. Distributed controller 500 may include a network interface 532 configured to communicate with a communication network. Distributed controller 500 may also include a time input 540, which may be used to receive a time signal. In certain embodiments, a common time reference may be received via network interface 532, and accordingly, a separate time input 540 and/or Global Navigation Satellite System (GNSS) time input 536 may not be necessary. One such embodiment may employ the IEEE 1588 protocol. Alternatively, a GNSS input 536 may be provided in addition to, or instead of, time input 540.

A monitored machine or equipment interface 529 may be configured to receive equipment status information from, and issue control instructions to a piece of monitored equipment, such as an electrical generator, breaker, voltage regulator control, and/or the like. According to certain embodiments, the monitored equipment interface 529 may be configured to interface with a variety of equipment of an electric power delivery system. In certain embodiments, the equipment status information and/or control instructions may be communicated over the network interface 532.

A computer-readable storage medium 526 may be the repository of one or more modules and/or executable instructions configured to implement any of the processes described herein. A data bus 542 may link monitored equipment interface 529, time input 540, network interface 532, GNSS time input 536, and the computer-readable storage medium 526 to a processor 524.

Processor 524 may be configured to process communications received via network interface 532, time input 540, GNSS time input 536, and/or monitored equipment interface 529. Processor 524 may operate using any number of processing rates and architectures.

Processor 524 may be configured to perform various algorithms and calculations described herein using computer executable instructions stored on computer-readable storage medium 526. Processor 524 may be embodied as a general purpose integrated circuit, an application specific integrated circuit, a field-programmable gate array, and/or other programmable logic devices.

In certain embodiments, distributed controller 500 may include a sensor component 520. In the illustrated embodiment, sensor component 520 is configured to gather data from a portion of the electric power delivery system (not shown) using a current transformer 502 and/or a voltage transformer 514. Voltage transformer 514 may be configured to step-down the power system's voltage (V) to a secondary voltage waveform 512 having a magnitude that can be readily monitored and measured by distributed controller 500. Similarly, current transformer 502 may be configured to proportionally step-down the power system's line current (I) to a secondary current waveform 504 having a magnitude that can be readily monitored and measured by distributed controller 500. Although not separately illustrated, the voltage and current signals V and I may be secondary signals obtained from equipment instruments designed to obtain signals from primary equipment. For example, a secondary voltage signal V may be obtained from a potential transformer (PT) in electrical communication with a conductor. A secondary current signal I may be obtained from a current transformer (CT) in electrical communication with a conductor. Various other instruments may be used to obtain signals from electric power delivery systems including, for example, Rogowski coils, optical transformers, and the like. An analog-to-digital converter 518 may multiplex, sample and/or digitize the filtered waveforms to form corresponding digitized current and voltage signals. Similar values may also be received from other distributed controllers, station controllers, regional controllers, or centralized controllers. The values may be in a digital format or other format.

As described above, certain embodiments may monitor the terminal voltage of one or more phases of electrical power generated by an electrical generator. Sensor component 520 may be configured to perform this task. Further, sensor component 520 may be configured to monitor a wide range of characteristics associated with monitored equipment, including equipment status, temperature, frequency, pressure, density, infrared absorption, radio-frequency information, partial pressures, viscosity, speed, rotational velocity, mass, switch status, valve status, circuit breaker status, tap status, meter readings, and the like.

A/D converter 518 may be connected to processor 524 by way of a bus 542, through which digitized representations of current and voltage signals may be transmitted to processor 524. As described above, processor 524 may be used to apply equipment status, measurements, and derived values to an IED module. Processor 524 may be used to determine and issue control instructions.

It should be noted that a separate device may be used in place of a sensor component for providing signals from the electric power delivery system to the distributed controller 500. Indeed, a separate device may be configured to obtain signals from the electric power delivery system (such as voltage and/or current signals), and create digitized representations of the signals (for example current and voltage signals), apply a time stamp, and/or supply such information to the distributed controller 500. Further, the separate device may be configured to supply equipment status and/or measurements such as voltage and/or current magnitudes and/or angles along with time stamps to the distributed controller 500. In certain embodiments, the information that has been described as received from sensor component 520 is instead received from network interface 532.

A monitored equipment interface 529 may be configured to receive status information from, and issue control instructions to a piece of monitored equipment. Monitored equipment interface 529 may be configured to issue control instructions to one or more pieces of monitored equipment. According to some embodiments, control instructions may also be issued via network interface 532. Control instructions issued via network interface 532 may be transmitted, for example, to other distributed controllers, coordination controllers, IEDs, or the like (not shown), which in turn may issue the control instruction to a piece of monitored equipment. Alternatively, the piece of monitored equipment may receive the control instruction directly via its own network interface.

Computer-readable storage medium 526 may be the repository of one or more modules and/or executable instructions configured to implement certain functions described herein. For example, computer-readable storage medium 526 may include a distributed controller module 560, which may be a repository of the modules and/or executable instructions configured to implement distributed controller functionality of distributed controller 500. The distributed controller module 560 may include, among others, operating stage module 561, control strategy module 562, parameter adjustment module 563, trajectory determination module 564, assessment module 565, communication module 570, and control module 571.

Operating stage module 561 may receive information from a plurality of distributed controllers, IEDs, and other devices regarding electrical conditions and control actions. Based upon such information, operating stage module 561 may determine an appropriate operating stage. Further operating stage module 561 may be configured to adjust a determination of the appropriate operating stage, based upon updated information Control strategy module 562 may be configured to implement a control strategy based upon the operating stage. As described above, a control strategy may be communicated among control devices (e.g., distributed controllers, IEDs, central monitoring systems, etc.) within an electric power delivery system. According to some embodiments, control strategy module 562 may associate a control strategy with an operating stage and may adjust the control strategy as appropriate based upon particular circumstances in the electric power delivery system.

Parameter adjustment module 563 may be configured to determine adjustments to parameters of various components in the electric power delivery system based upon the identified operating stage and control strategy. For example, as described in connection with FIG. 4A and FIG. 4B, adjustments may be made to a control strategy for a load tap changer during an alert operating stage. Parameter adjustment module 563 may be configured to make adjustments for implementation by a variety of types of monitored equipment in an electric power delivery system.

Trajectory determination module 564 may be configured to analyze a plurality of indications of electrical conditions in the electric power delivery system and differentiate various electrical conditions based upon the plurality of indications. For example, the trajectory determination module 564 may be configured to differentiate between a fault condition, an impending overload condition, a crossed overload condition, and a low voltage condition. The trajectory determination module 564 may provide an input to the operating stage module.

Assessment module 565 may include instructions for indicating proximity to conditions that would trigger a control action. The control action may be a continuous or discontinuous control operation. The point at which a control action is issued may be referred to as a control boundary. Information regarding proximity to a control boundary may be communicated to other distributed controllers and/or other devices in communication with distributed controller 500 using the communication module 570, as described in more detail below. Further, such information may be used to adjust parameters of various control devices in an electric power delivery system.

Assessment module 565 may permit distribution controller 500 to obtain information about actions to be taken in the future by the distributed controller 500 and/or a time before such actions are to be taken may be communicated to other distributed controllers and/or other devices.

The control module 571 may be configured for interacting with monitored equipment connected to distributed controller via monitored equipment interface 529 and/or via network interface 532. According to some embodiments, control instructions from the control module 570 may be intended as control instructions for other distributed controllers and/or monitored equipment located remote to distributed controller 500. In some cases, control instructions may be only informative or suggestive in nature in that the receiving distributed controller is not obligated to perform the control instruction, but may use the suggested control instruction in coordination with its own determinations and those from other controllers to determine whether it will perform the control instruction. That is, the receiving distributed controller may use the suggested control instruction to determine a future state of the electric power delivery system using its component model module, and use the result of its component model module to issue a control instruction to its monitored equipment. In other cases control instructions may be directive in that they are required actions. Differentiation between these cases may be included with the control instruction.

The communication module 570 may include instructions for facilitating communication of information from distributed controller 500 to other controllers and/or other components in the electric power delivery system. The communication module 570 may include instructions on the formatting of communications according to a predetermined protocol. For example, the distributed controllers and controllers may be configured to communicate according to the IEC 61850 protocol, wherein the communication module 570 may be configured to format communications according to that protocol and receive communications according to that protocol. Communication module 570 may be configured with subscribers to certain information, and format message headers according to such subscription information.

Figure 6:
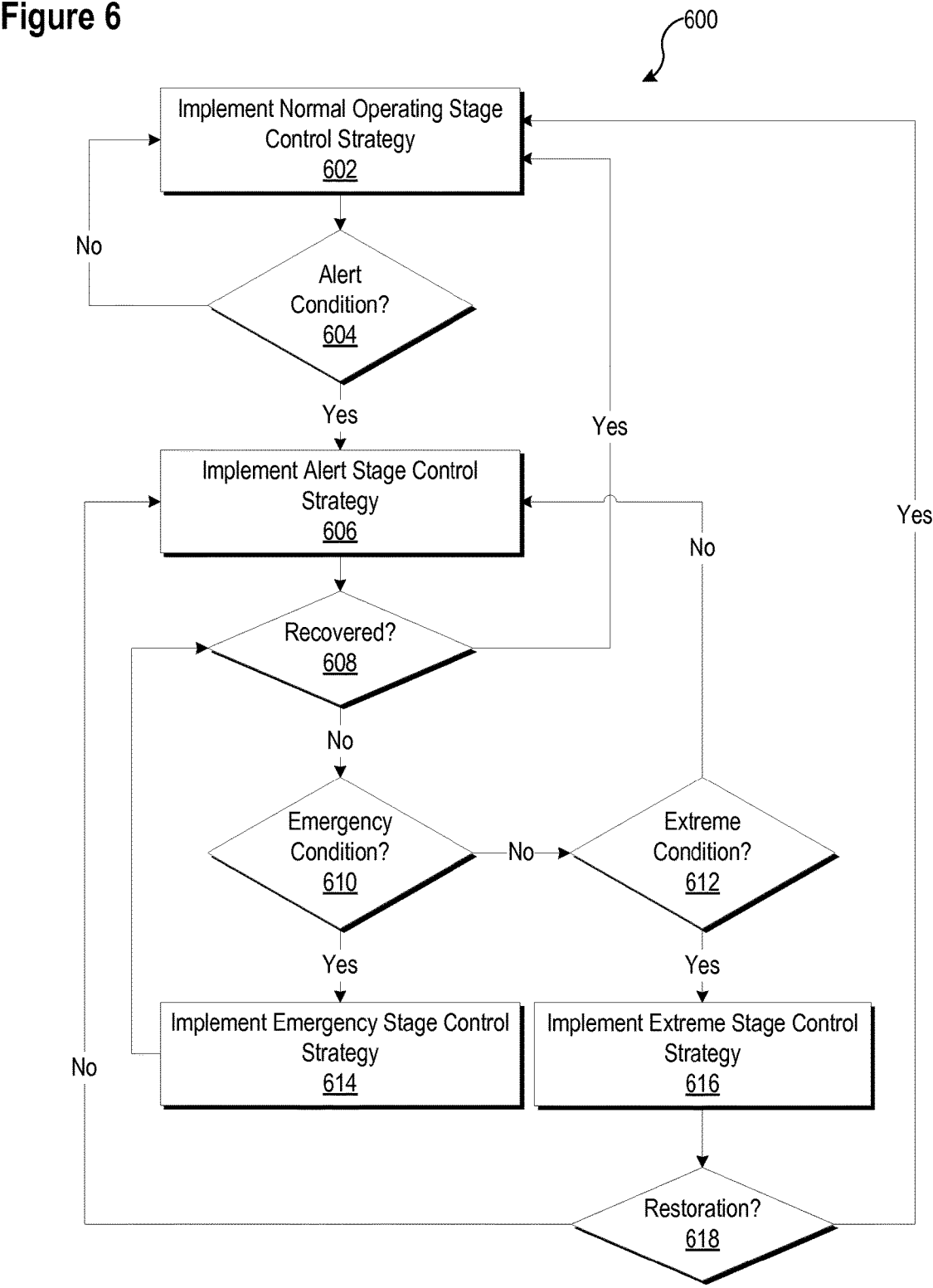
FIG. 6 illustrates a flowchart of a method for determining an operating condition of a distributed controller consistent with embodiments of the present disclosure.

FIG. 6 illustrates a flowchart of a method 600 for determining an operating condition of a distributed controller consistent with embodiments of the present disclosure. Method 600 may be implemented using a distributed controller that is in communication with an electric power delivery system. Under typical conditions, a normal operating stage control strategy may be implemented at 602. Upon a determination of an alert condition, at 604, an alert stage control strategy 606 may be implemented. The alert stage control strategy may provide flexibility during times of peak demand or temporary stress while maintaining the reliability of the electric power delivery system. Various control actions may be implemented in connection with the alert stage control strategy. For example, control actions associated with the alert stage control strategy may include adjusting control parameters associated with various types of monitored equipment with the electric power delivery system. At 608, method 600 may determine whether the electric power delivery system has recovered (e.g., the period of peak demand or temporary stress has passed). If so, method 600 may resume implementation of the normal operating stage control strategy at 602. If not, method 600 may determine whether an emergency whether an emergency condition is detected at 610.

If an emergency condition is detected at 610, an emergency stage control strategy may be implemented at 614. According to some embodiments, the emergency stage control strategy may increase generation capacity of the electric power delivery system and/or improve utilization of available electric power generation sources. For example, additional power generation capacity may be brought online, generation may be re-dispatched, and/or power may be purchased from a remote provider.

If an emergency condition is not detected at 610, method 600 may determine whether an extreme condition is detected at 612. If an extreme condition is not detected, method 600 may implement the alert stage control strategy at 606. If an extreme condition is detected, an extreme stage control strategy may be implemented at 616. The extreme stage control strategy may decrease loading on the electric power delivery system by, for example, shedding load. As conditions permit, loads that were disconnected at 616 may be selectively restored. At 618, method 600 may determine whether restoration of disconnected loads has occurred. If restoration has not been completed, method 600 may return to 606. If restoration has been completed, method 600 may return to 602.

While specific embodiments and applications of the disclosure have been illustrated and described, it is to be understood that the disclosure is not limited to the specific configurations and components disclosed herein. Accordingly, many changes may be made to the details of the above-described embodiments without departing from the underlying principles of this disclosure. The scope of the present invention should, therefore, be determined only by the following claims.

What is claimed is:

1. A controller configured to implement a distributed control scheme in an electrical power delivery system, the controller comprising:
   a communications interface in communication with a plurality of control devices, each of the control devices distributed from the controller;
   a processor communicatively coupled to the communications interface; and
   a non-transitory computer-readable storage medium comprising instructions that, when executed by the processor, enable the controller to:
     receive a plurality of indications of electrical conditions from the plurality of control devices in electrical communication with distributed portions of the electrical power delivery system, the plurality of indications including impending overload condition indications, crossed overload condition indications, and electrical power system measurements from the plurality of control devices;
     determine an operating stage from among a plurality of operating stages based upon the impending overload condition indications, overload condition indications, and electrical power system measurements from the distributed portions of the electrical power delivery system;
     select a control strategy based upon the operating stage, the control strategy for a control device of the plurality of control devices causing the control device to implement a first control action for measured electrical conditions different from a second control action for the measured electrical conditions before selection of the control strategy; and
     communicate the control strategy to the plurality of control devices via the communications interface;
   wherein the plurality of control devices are configured to implement a plurality of control actions based upon the control strategy.

2. The controller of claim 1, wherein the plurality of operating stages comprise an alert operating stage in which the control strategy permits the electrical power delivery system to prohibit implementation of a category of control actions during a temporary condition in the electrical power delivery system.

3. The controller of claim 2, wherein the instructions further enable the controller to generate at least one of the plurality of control actions based on the alert operating stage, the at least one control action comprising one of adjusting a set-point of an active volt-ampere reactive ("VAR") device and adjusting a threshold of a direct current line.

4. The controller of claim 2, wherein the instructions further enable the controller to receive a load characteristic estimate from one of a plurality of control devices and to generate at least one of the plurality of control actions based on the alert operating stage, the at least one control action comprising adjusting a setting of a tap changer controlling a change of a tap position based on the load characteristic estimate.

5. The controller of claim 1, wherein the plurality of operating stages comprise an alert operating stage in which the control strategy permits the electrical power delivery system to delay implementation of a category of control actions during a temporary condition in the electrical power delivery system.

6. The controller of claim 1, wherein the plurality of operating stages comprises an emergency operating stage in which the control strategy increases a capacity of the electrical power delivery system.

7. The controller of claim 6, wherein the instructions further enable the controller to generate at least one of the plurality of control actions based on the emergency operating stage, the at least one control action comprising one of re-dispatching generation of electrical energy, starting reserve generation capacity, and importing remotely generated power.

8. The controller of claim 1, wherein the plurality of operating stages comprises an emergency operating stage in which the control strategy comprises a demand response strategy.

9. The controller of claim 1, wherein the plurality of operating stages comprises an extreme stage in which the control strategy reduces a cumulative load on the electrical power delivery system.

10. The controller of claim 9, wherein the instructions further enable the controller to generate at least one control action based on the extreme stage, the at least one control action comprising one of selectively disconnecting a portion of the cumulative load and implementing transmission line loading relief.

11. The controller of claim 1, wherein the operating stage is determined, at least in part, based on the plurality of indications of electrical conditions comprising an indication of an asset removal from the electrical power delivery system.

12. The controller of claim 1, wherein the first control action comprises a continuous control action and the second control action comprises a discontinuous control action.

13. A method of implementing distributed control in an electrical power delivery system, the method comprising:
    measuring, by a plurality of control devices in electrical communication with distributed portions of the electrical power delivery system, a plurality of electrical power system measurements;
    determining, by the plurality of control devices, a plurality of indications including impending overload condition indications, and crossed overload condition indications using the electrical power system measurements;
    sending, from the plurality of control devices, the plurality of indications and electrical power system measurements to a controller;
    receiving, at the controller, the plurality of indications including the impending overload condition indications, the crossed overload condition indications, and the electrical power system measurements from a plurality of control devices in electrical communication with distributed portions of the electrical power delivery system;
    determining an operating stage from among a plurality of operating stages based upon the impending overload condition indications, crossed overload condition indications, and the electrical power system measurements from the distributed portions of the electrical power delivery system;
    selecting a control strategy based upon the operating stage, the control strategy for a control device of the plurality of control devices causing the control device to implement a first control action for measured electrical conditions different from a second control action for the measured electrical conditions before identification of the control strategy;
    communicating the control strategy to the plurality of control devices via the communications interface;
    implementing, using the plurality of control devices, a plurality of control actions based upon the control strategy.

14. The method of claim 13, wherein the control strategy comprises delaying implementation of a category of control actions during a temporary condition in the electrical power delivery system.

15. The method of claim 13, wherein plurality of control actions comprise adjusting a set-point of an active volt-ampere reactive ("VAR") device and adjusting a threshold of a direct current line.

16. The method of claim 13, further comprising:
    receiving a load characteristic estimate from one of the plurality of control devices; and
    wherein plurality of control actions comprise one of adjusting a setting of a tap changer and controlling a change of a tap position based on the load characteristic estimate.

17. The method of claim 13, wherein plurality of control actions comprise at least one of re-dispatching generation of electrical energy, starting reserve generation capacity, and importing remotely generated power; and implementing a demand response strategy.

18. The method of claim 13, further comprising reducing a cumulative load on the electrical power delivery system.

19. The method of claim 13, wherein determining the operating stage is based, at least in part, on the plurality of indications of electrical conditions comprising an indication of an asset removal from the electrical power delivery system.

20. The method of claim 13, wherein the first control action comprises a continuous control action and the second control action comprises a discontinuous control action.

* * * * *